(12) United States Patent
Mehta et al.

(10) Patent No.: US 7,885,858 B2
(45) Date of Patent: Feb. 8, 2011

(54) SYSTEM AND METHOD FOR MANAGING INFORMATION HANDLING SYSTEM WIRELESS NETWORK PROVISIONING

(75) Inventors: Pratik M. Mehta, Austin, TX (US); Michael Ryan, Del Valle, TX (US); Roger Cameron, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1417 days.

(21) Appl. No.: 11/338,475

(22) Filed: Jan. 24, 2006

(65) Prior Publication Data

US 2007/0174131 A1    Jul. 26, 2007

(51) Int. Cl.
G07G 1/12    (2006.01)
H05K 1/14    (2006.01)
G06F 9/445   (2006.01)

(52) U.S. Cl. .................... 705/26; 361/737; 717/175
(58) Field of Classification Search .............. 705/26; 361/737; 717/175
See application file for complete search history.

(56) References Cited

U.S. PATENT DOCUMENTS

| | | | | |
|---|---|---|---|---|
| 5,485,505 A * | 1/1996 | Norman et al. | ............ | 455/419 |
| 5,887,253 A * | 3/1999 | O'Neil et al. | ............ | 455/418 |
| 6,014,561 A * | 1/2000 | Molne | ............ | 455/419 |
| 6,029,143 A * | 2/2000 | Mosher et al. | ............ | 705/28 |
| 6,393,408 B1 * | 5/2002 | Mosher et al. | ............ | 705/28 |
| 6,499,017 B1 * | 12/2002 | Feibelman et al. | ............ | 705/8 |
| 6,598,223 B1 * | 7/2003 | Vrhel et al. | ............ | 717/174 |
| 6,668,375 B1 * | 12/2003 | Leovac | ............ | 717/174 |
| 6,775,829 B1 * | 8/2004 | Kroening | ............ | 717/175 |
| 6,853,978 B2 * | 2/2005 | Forth et al. | ............ | 705/26 |
| 6,895,389 B1 * | 5/2005 | Fischburg | ............ | 705/26 |
| 7,065,499 B1 * | 6/2006 | Seth et al. | ............ | 705/26 |
| 7,110,751 B1 * | 9/2006 | Overby | ............ | 455/418 |
| 7,194,323 B2 * | 3/2007 | Kritt et al. | ............ | 700/97 |
| 7,200,112 B2 * | 4/2007 | Sundar et al. | ............ | 370/230 |
| 7,254,645 B2 * | 8/2007 | Nishi | ............ | 709/249 |
| 7,310,611 B2 * | 12/2007 | Shibuya et al. | ............ | 705/26 |
| 7,353,017 B2 * | 4/2008 | Chen et al. | ............ | 455/414.2 |
| 7,356,597 B2 * | 4/2008 | Van Buuren et al. | ............ | 709/227 |
| 7,505,921 B1 * | 3/2009 | Lukas et al. | ............ | 705/26 |
| 7,549,007 B1 * | 6/2009 | Smith et al. | ............ | 710/303 |
| 7,640,039 B2 * | 12/2009 | Kamada | ............ | 455/558 |
| RE41,803 E * | 10/2010 | Hutcheson et al. | ............ | 455/406 |

(Continued)

FOREIGN PATENT DOCUMENTS

WO    WO 2004/062248    *    7/2004

*Primary Examiner*—Matthew S Gart
*Assistant Examiner*—Ashford Hayles
(74) *Attorney, Agent, or Firm*—Hamilton & Terrile, LLP; Robert W. Holland

(57) ABSTRACT

Information handling systems are built to order with provisioned wireless wide area network (WWAN) service coordinated through a WWAN network provider as part of the manufacture of the information handling system. A WWAN component is built into the information handling system and then queried to retrieve a WWAN identifier, such as ESM or SIM information. The identifier is associated with end user information of the information handling system and formatted as a request for WWAN provisioning sent to a network service provider. The network service provider applies the WWAN identifier and end user information to contact the end user for setting up a WWAN account or, alternatively, to automatically set up a WWAN account for the end user.

15 Claims, 2 Drawing Sheets

U.S. PATENT DOCUMENTS

| | | | |
|---|---|---|---|
| 2001/0001866 A1* | 5/2001 | Kikinis | 709/220 |
| 2002/0120521 A1* | 8/2002 | Forth et al. | 705/26 |
| 2002/0120857 A1* | 8/2002 | Krishnan et al. | 713/193 |
| 2002/0123335 A1* | 9/2002 | Luna et al. | 455/419 |
| 2002/0156694 A1* | 10/2002 | Christensen et al. | 705/26 |
| 2003/0013434 A1* | 1/2003 | Rosenberg et al. | 455/414 |
| 2003/0048605 A1* | 3/2003 | Kyozuka et al. | 361/686 |
| 2003/0061123 A1* | 3/2003 | McMenimen et al. | 705/28 |
| 2004/0006516 A1* | 1/2004 | Anagol-Subbarao et al. | 705/26 |
| 2005/0083846 A1* | 4/2005 | Bahl | 370/236 |
| 2005/0090248 A1* | 4/2005 | Shen et al. | 455/432.1 |
| 2005/0165653 A1* | 7/2005 | Meaney et al. | 705/26 |
| 2005/0203755 A1* | 9/2005 | Krishnamoorthy | 705/1 |
| 2005/0286476 A1 | 12/2005 | Crosswy et al. | 370/338 |
| 2005/0288056 A1* | 12/2005 | Bajikar et al. | 455/554.2 |
| 2006/0075242 A1* | 4/2006 | Aissi et al. | 713/176 |
| 2006/0098405 A1* | 5/2006 | Bloebaum | 361/685 |
| 2006/0116507 A1* | 6/2006 | Oppermann et al. | 530/840 |
| 2007/0127220 A1* | 6/2007 | Lippert et al. | 361/737 |
| 2007/0240154 A1* | 10/2007 | Gerzymisch et al. | 717/174 |
| 2008/0025243 A1* | 1/2008 | Corneille et al. | 370/313 |

* cited by examiner

SYSTEM AND METHOD FOR MANAGING INFORMATION HANDLING SYSTEM WIRELESS NETWORK PROVISIONING

BACKGROUND OF THE INVENTION

1. Field of the Invention

The present invention relates in general to the field of information handling system networking, and more particularly to a system and method for managing information handling system wireless wide area network provisioning.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have become a valuable tool for businesses and individuals to communicate. For instance, e-mail, instant messaging and web-based solutions have replaced the telephone as the most common media for communicating within an office environment and are rapidly replacing the telephone as customers' preferred way to communicate with businesses. One difficulty with communication media that rely on information handling systems is that an information handling system typically is tied to a networking environment in order to support such media. When an individual is away from his desk, the individual cannot typically retrieve messages sent to a desktop information handling system. Some flexibility exists with mobile information handling systems that support wireless local area networks (WLANs), however, WLANs typically have a restricted range. Although wireless hotspots have sprung up around airports and hotels frequented by travelers, such hotspots are often not secure and sometimes have access fees collected by a variety of vendors. An alternative that provides greater accessibility and security is wireless wide area networks (WWANs) that use cellular telephone network transceivers to establish a network connection. WWANs have coverage that compares with cellular telephone coverage and generally supports fairly high bandwidth communication. Information handling system users purchase a WWAN networking card, such as a PCMCIA card, that establishes connection with a desired network and pay an access fee to that network provider.

One difficulty with the use of WWANs supported by cellular telephone networks is that the user typically has to install a networking application of the network provider and establish an account with the network provider before the WWAN networking card will work. In order to establish an account, the user typically must pass a credit check, provision the account and activate the account. Provisioning involves an account plan selection and the loading of customer information into the WWAN, such as a SIM ICCID that identifies the user's WWAN transceiver. Activation occurs when the user commits to liability for the provisioned account. Often, activation involves a telephone call by the user to the network provider with associated call-queue phone hold times. In some cases, activation is delayed by a day or even longer while the network provider performs a credit check and provisions the network to accept the user's transceiver with an associated account. Increased delays can occur when an error occurs in the activation process, such as mismatch of identification codes that permit network access. Difficulties that arise with a user's provisioning and activation that result in delays or failures by the user to interface with the WWAN sometimes result in user calls to the information handling system manufacturer for technical support. Such requests for technical support increase manufacturer costs and negatively impact the user experience. In addition, inaccurate tracking of card-specific information that leads to such difficulties negatively impacts the information handling system manufacturer's revenue from sales of network provider services.

SUMMARY OF THE INVENTION

Therefore a need has arisen for a system and method which automates provisioning of WWAN service associated with an information handling system.

In accordance with the present invention, a system and method are provided which substantially reduce the disadvantages and problems associated with previous methods and systems for provisioning WWAN service associated with an information handling system. A WWAN card of an information handling system is queried for a unique identifier during the build of the information handling system. The unique identifier and end user information are forwarded to a network provider to provision the WWAN card for access to a WWAN so that the end user receives the information handling system with WWAN capability enabled and prepared for activation.

More specifically, an information handling system manufacturer receives an order for an information handling system from an end user that specifies the hardware and software configuration of the system, including a WWAN card to access a WWAN. Once the information handling system is built with the ordered configuration, a unique system identifier and a unique WWAN identifier are retrieved from the system and checked against expected values to ensure proper build of the system. A WWAN provisioning engine located at the information handling system manufacture location formats the WWAN identifier together with end user information and forwards the information to a WWAN provider for provisioning of an account on the WWAN associated with the WWAN identifier and end user. For instance, the WWAN service provider uses the end user information to contact the end user for account information needed to provision an account. Alternatively, the end user information includes information to support the provisioning of an account by the WWAN service provider. Since the WWAN account is set up and provisioned during manufacture of the information handling system, the end user receives the information handling system with a WWAN component enabled to interact with the WWAN of the WWAN provider to activate the account with minimal delays or difficulties.

The present invention provides a number of important technical advantages. One example of an important technical advantage is that a newly manufactured information handling system is built-to-order for delivery to an end user with WWAN service provisioned and ready to use for activation. Delivery of an information handling system with WWAN service provisioned improves the out-of-box experience for the end user and reduces risk of errors that require the information handling system manufacturer to provide technical support. The end user is able to purchase WWAN service with an information handling system for greater convenience, reduced complexity and without extensive delays between the delivery of the information handling system and the usability of network connectivity. Automated management of WWAN card provisioning executes at factory line production speeds so that incorporation of WWAN cards and services do not substantially impact system build and delivery times.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Provisioning WWAN components of information handling systems to use a wireless network service provider's WWAN as part of the manufacture of the information handling systems provides an improved end user experience. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
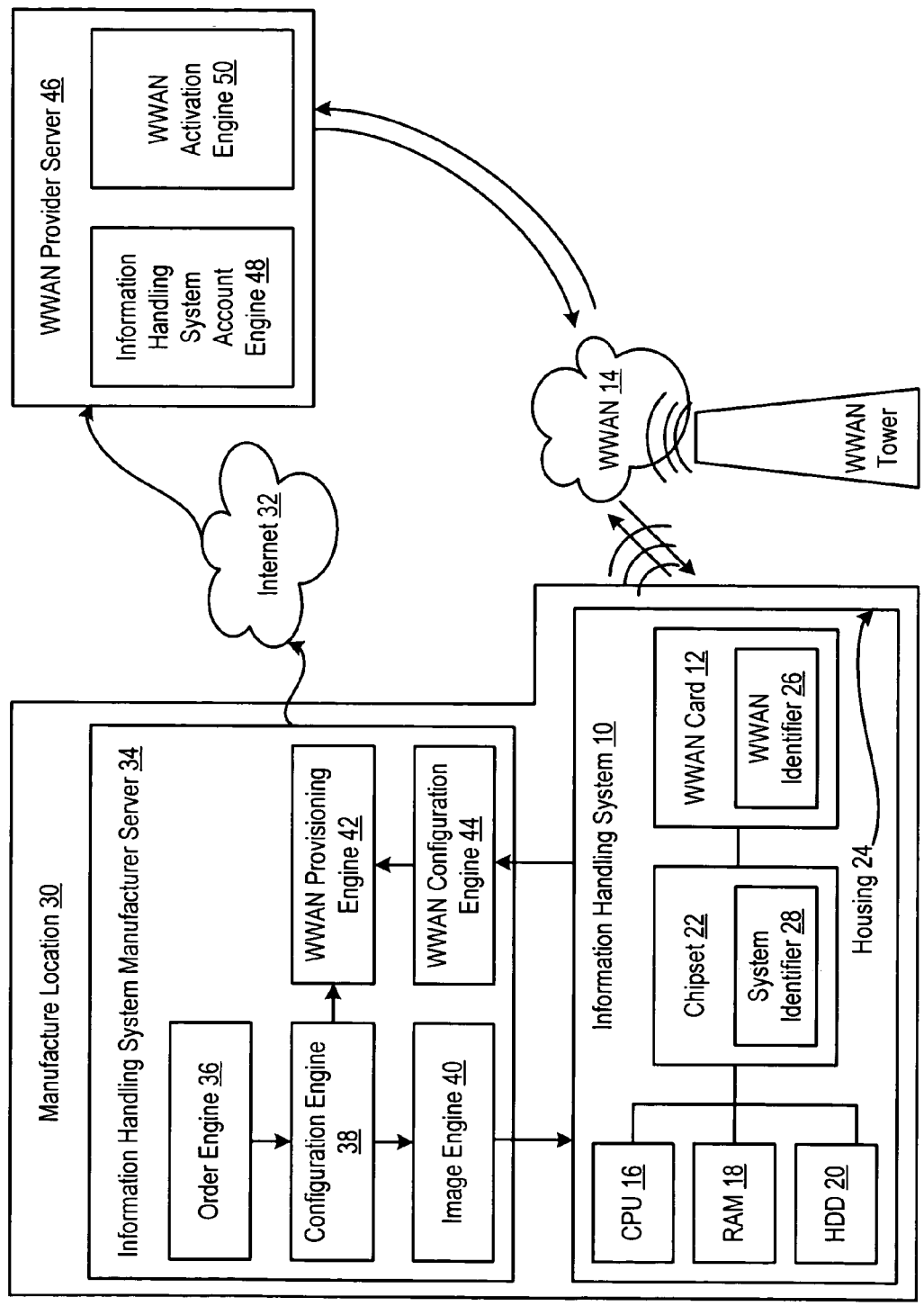
FIG. 1 depicts a block diagram of a system for manufacture of information handling systems having WWAN components provisioned to use a WWAN.

Referring now to FIG. 1, a block diagram depicts a system for manufacture of information handling systems 10 having WWAN components 12 provisioned to use a wireless wide area network (WWAN) 14, such as a cellular telephone network. Information handling system 10 is built from plural processing components that cooperate to process information, such as a CPU 16, RAM 18, hard disk drive 20, chipset 22 and the WWAN card 12. WWAN card 12 is essentially a cellular telephone transceiver specialized to communicate more general information through WWAN 14 instead of the voice information typically communicated by cellular telephones. WWAN card 12 may be integrated within the housing 24 of information handling system 10 as an internal component or interfaced as an external card into an external port, such as a PCMCIA port. A unique WWAN identifier 26, such as ESN or SIM information is embedded in WWAN card 12 so that WWAN 14 may recognize card 12 to authorize and track use of the network. Similarly, a unique system identifier 28 embedded in chipset 22 allows the manufacturer of information handling system 10 to uniquely identify the system, such as for maintenance or warranty service.

Information handling system 10 is built at a manufacture location 30, such as from orders taken by customers through Internet 32 using a build-to-order manufacture process. For instance, an information handling system manufacture server 34 supports an order engine 36 that presents end users with a variety of hardware and software configuration options. Order engine 36 receives an order from the end user having configuration information defining a desired configuration, such as hardware and software components to be built into the ordered information handling system. Order engine 36 also receives end user information to arrange payment terms for the end user to purchase the ordered information handling system as well as delivery of the system to a desired end user location. One configuration option presented by order engine 36 is the inclusion of an internal or external WWAN card 12 with associated applications, such as drivers to run WWAN card 12 and interface applications that interface an information handling system 12 with services provided by a network service provider that operates WWAN 14. For instance, the end user selects a type of WWAN card 12 with desired capabilities and a network service provider that supports network access by the selected WWAN card 12. In one embodiment, the end user is presented with a WWAN account information form that allows the end user to provide payment and other WWAN account information for the network provider to set up an account for access by the built-to-order information handling system 10 to WWAN 14.

Configuration engine 38 generates a manifest that defines the assembly of processing components to fill the order and tracks the build of the information handling system to match the hardware configuration ordered by the end user. After assembly of the hardware components, system identifier 28 is used to ensure that the correct information handling system is interfaced with server 34 so that image engine 40 can copy an image with the applications defined by the ordered configuration. In addition, configuration engine 38 provides order information to a WWAN provisioning engine 42, which applies the order information to provision WWAN service associated with the information handling system. For instance, a WWAN configuration engine 44 reads WWAN identifier 26 from WWAN card 12 and system identifier 28 from chipset 22 and provides the identifiers to WWAN provisioning engine 42. WWAN provisioning engine 42 checks the WWAN identifier 26 and system identifier 28 against values expected from the configuration of configuration engine 38 and provides an error warning if the values fail to match. If system identifier 28 and WWAN identifier 26 read from information handling system 10 match the values expected from configuration engine 38, then WWAN provisioning engine 42 formats end user information into a provisioning request for communication to a WWAN provider server 46 through Internet 32. For instance, an XML file is communicated to WWAN provider server 46 for use in provisioning of WWAN service for WWAN card 12 of information handling system 10.

Provisioning of WWAN service for WWAN card 12 is performed at WWAN provider server 46 based on the WWAN identifier and end user information provided from WWAN provisioning engine 42 to an information handling system account engine 48. Information handling system account engine 48 sets up an account for the end user and forwards provisions the WWAN identifier as an active account on WWAN 14. Upon initial contact by WWAN card 12 with WWAN 14, an activation engine 50 activates the account by interacting with the user to commit to the account terms, after which the user has full access to the already-provisioned account. In one embodiment, information handling system account engine 50 sets up the account by contacting the end user with the end user information to collect account information. In an alternative embodiment, account information is provided that is sufficient to provision the account without contacting the end user, such as by providing an account set up page to the end user with order engine 36 and sending the end user's inputs through WWAN provisioning engine 42. Once the account is provisioned, information handling system account engine 48 can send a confirmatory message of a successful account set up to information handling system 10 at manufacture location 30 through WWAN 14 to ensure proper operation of WWAN card 12 before system 10 is shipped to the end user. In another alternative embodiment, WWAN activation is supported by accepting a user commitment to liability through order engine 36 and providing the commitment to WWAN activation engine 50 so that information handling system 10 is delivered to the end user with a provisioned and activated WWAN card.

Figure 2:
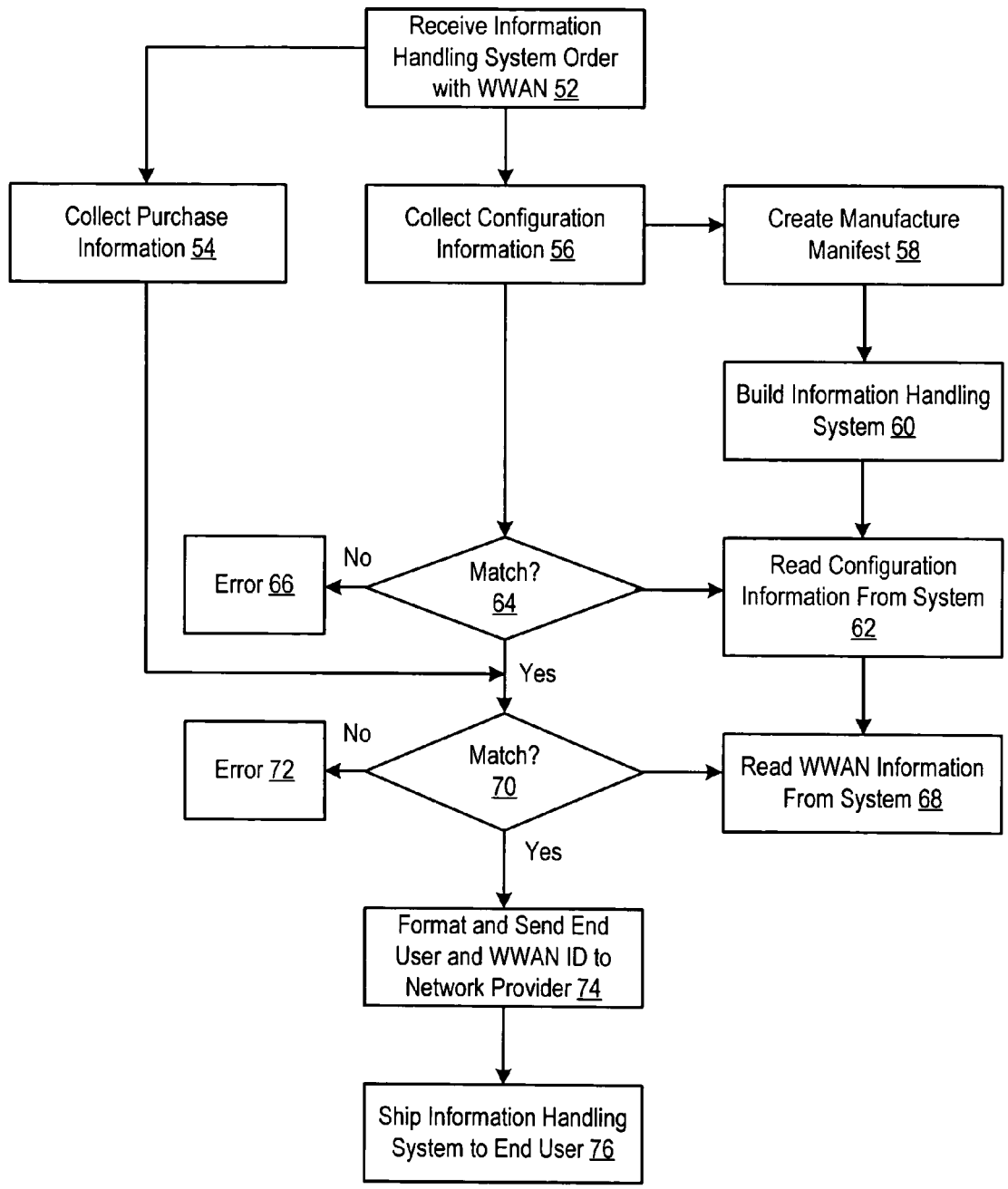
FIG. 2 depicts a flow diagram of a process for manufacture of information handling systems having WWAN components provisioned to use a WWAN.

Referring now to FIG. 2, a flow diagram depicts a process for manufacture of information handling systems having WWAN components provisioned to use a WWAN. The process begins at step 52 with the receipt of an order from an end user for an information handling system having WWAN capability. At step 54, purchase information is collected, such as payment and delivery information for the information handling system and, in one embodiment, purchase information for WWAN service. At step 56, configuration information is collected, such as the hardware and software components to be included in the information handling system. At step 58, a manufacture manifest is created to guide the assembly of the hardware and software components into a physical system to fulfill the end user order. At step 60, the information handling system is built from the manifest and, at step 62 the configuration information is read from the information handling system including the system unique identifier. At step 64, the configuration read from the information handling system is compared with the configuration information ordered by the end user to ensure that the system was properly built with an error issued at step 66 if the read and planned configurations fail to match. At step 68, the WWAN identifier is read from the information handling system and, at step 70, is compared with configuration information to ensure the proper WWAN card was built into the system, with an error issued at step 72 if the read and planned configurations fail to match.

Configuration information and end user information are stored in a database during the manufacture process. The WWAN identifier and information handling system identifier that are read from the system are stored with database keys to allow rapid joining with end user information to retrieve, for instance, name and delivery instructions. At step 74, the database keys support joining of end user information, system identifier and WWAN identifier in a meta-record, such as an XML file, for forwarding to a network service provider. The network service provider applies the information from the XML file to provision an account for the end user and, in one embodiment, to activate the account to allow full access by the WWAN card to the WWAN. The end user account is provisioned and, in some instances even activated, to that the information handling system is shipped to the end user at step 76 with the end user able to communicate over the WWAN upon delivery of the information handling system.

Although the present invention has been described in detail, it should be understood that various changes, substitutions and alterations can be made hereto without departing from the spirit and scope of the invention as defined by the appended claims.

What is claimed is:

1. A system for manufacture of an information handling system having a provisioned WWAN component, the system comprising:
    a processor operable to execute instruction;
    memory interfaced with the processor, the memory storing instructions for:
    an order engine operable to accept an order for the information handling system having the provisioned WWAN component, the order having configuration information defining the configuration of the information handling system and WWAN information defining WWAN provider and end user information;
    a configuration engine interfaced with the order engine and operable to generate a manifest for building the information handling system with the order configuration to include the WWAN component;
    a WWAN configuration engine operable to interface with the information handling system built according to the manifest and retrieve a unique identifier associated with the WWAN component; and
    a WWAN provisioning engine interfaced with the WWAN configuration engine, the WWAN provisioning engine operable to format an provisioning request having the WWAN component unique identifier and the WWAN end user information and to send the provisioning request to the WWAN provider.

2. The system of claim 1 wherein the WWAN component unique identifier comprises ESN information.

3. The system of claim 1 wherein the WWAN component unique identifier comprises SIM information.

4. The system of claim 1 wherein the end user information comprises information for the network provider to contact the end user and set up an account to access the WWAN.

5. The system of claim 1 further comprising an information handling system account engine associated with the WWAN provider and operable to receive the provisioning request and to automatically provision an account for the end user to access the WWAN.

6. The system of claim 5 further comprising a WWAN activation engine associated with the WWAN provider and interfaced with the information handling system account engine, the WWAN activation engine operable to activate the end user account on the WWAN.

7. The system of claim 5 wherein the WWAN configuration engine is further operable to interact with the WWAN provider through the WWAN component to confirm provisioning of the account.

8. The system of claim 7 further comprising an image engine interfaced with the information handling system and operable to install an application associated with the account on the information handling system.

9. A method for provisioning WWAN service for an information handling system, the method comprising:
- building the information handling system at a manufacture site, the information handling system having a WWAN component operable to support WWAN service;
- using a processor to reading from the information handling system a unique identifier associated with the WWAN component;
- using a processor to associating the WWAN component unique identifier with end user information and WWAN service provider information; and
- forwarding the WWAN component unique identifier and end user information from the manufacture site to the WWAN service provider;
- using a processor to provisioning the WWAN component to interact with the service provider WWAN; and
- shipping the information handling system from the manufacture site to an end user site.

10. The method of claim 9 wherein the WWAN component unique identifier comprises an ESN.

11. The method of claim 9 wherein the WWAN component unique identifier comprises a SIM.

12. The method of claim 9 wherein WWAN component comprises a WWAN card integrated into the information handling system.

13. The method of claim 9 wherein the end user information comprises information sufficient for the WWAN service provider to contact the end user and wherein provisioning the WWAN component further comprises contacting by the WWAN service provider of the end user with the end user information to set up an account for accessing the WWAN by the end user.

14. The method of claim 9 wherein the end user information comprises information sufficient for the WWAN service provider to set up an account for accessing the WWAN by the end user and wherein provisioning the WWAN component further comprises setting up an inactive account by the WWAN service provider for WWAN access by the end user.

15. The method of claim 14 further comprising:
- activating the end user account to the WWAN to authorize access by the WWAN component to the WWAN; and
- testing access of the WWAN component to the WWAN at the manufacture site.

* * * * *